United States Patent [19]

Lewis

[11] Patent Number: 5,371,504
[45] Date of Patent: Dec. 6, 1994

[54] PHASE-CODED MONOPULSE MTI
[75] Inventor: Bernard L. Lewis, Oxon Hill, Md.
[73] Assignee: The United States of America as represented by the Secretary of the Navy, Washington, D.C.
[21] Appl. No.: 700,925
[22] Filed: Jul. 6, 1976
[51] Int. Cl.[5] .................... G01S 13/58; G01S 13/08; G01S 13/52
[52] U.S. Cl. ................... 342/114; 342/132; 342/160
[58] Field of Search .............. 343/7.7, 8, 17.2 PC, 343/18 E; 342/114, 132, 160

[56] References Cited
U.S. PATENT DOCUMENTS

| | | | |
|---|---|---|---|
| 3,223,999 | 12/1965 | Groginsky | 343/17.1 R |
| 3,249,940 | 5/1966 | Erickson | 343/17.1 R |
| 3,631,490 | 12/1971 | Palmieri | 343/7.7 |
| 3,701,149 | 10/1972 | Patton et al. | 343/7.7 |
| 3,706,993 | 12/1972 | Kuck | 343/7.7 |
| 3,745,571 | 7/1973 | Chwastyk et al. | 343/17.2 PC |
| 3,905,033 | 9/1975 | Moore et al. | 343/7.7 |

Primary Examiner—Stephen C. Buczinski
Attorney, Agent, or Firm—Thomas E. McDonnell

[57] ABSTRACT

A pulse-compression, MTI, doppler-radar system for determining target velocity information from a single target-return pulse is improved by the addition of a pulse-compression filter consisting of at least two pulse compressors and by the addition of a phase-comparison processor. The pulse compressors simultaneously pulse-compress separate portions of the single target-return pulse. The phase-comparison processor then determines the phase difference between the compressed pulses to obtain the target velocity information.

4 Claims, 2 Drawing Sheets

PHASE-CODED MONOPULSE MTI

BACKGROUND OF THE INVENTION

1. Field of the Invention

This invention relates to a pulse-compression, MTI, doppler-radar system for determining target velocity information from a single uncompressed transmitted pulse. More specifically, the first and second halves of the reflected uncompressed pulse (hereinafter target-return pulse) are pulse-compressed separately and simultaneously and the phase difference therebetween compared to determine target velocity information.

2. Description of the Prior Art

Matched filters for MTI, pulse-compression, radar systems have been proposed that would act as doppler-filter banks yielding relatively coarse target velocity information on a single echo pulse. The theory for such a system is described in "Radar Signals", Cook and Bernfield, Academic Press, 1967, pp 287-293. Such a system may determine between which pair of target blind speeds a target velocity may lie, but cannot specifically determine the exact target velocity.

What is needed is a pulse-compression, MTI, doppler-radar system which will determine target velocity accurately from a single target-return pulse.

SUMMARY OF THE INVENTION

The present invention provides such a system, which includes a transmitter/receiver improved by the addition of a pulse-compression filter and a phase-comparison processor. The pulse-compression filter receives the output of the transmitter/receiver and includes at least two pulse compressors which simultaneously pulse-compress separate portions of the single target-return pulse. The phase-comparison processor receives the pulse-compressed signals from each pulse compressor and compares the phase information between the compressed pulses. The phase information provides an indication of target velocity and whether the target is approaching or traveling away from the radar.

An object of the invention is to provide a pulse-compression, MTI, doppler-radar system for providing target velocity information from a single target-return pulse.

Another object of the invention is to provide such a system utilizing two or more pulse compressors for pulse-compressing segments of the target-return pulse.

A further object of the system is to permit the measurement of target velocity from a single target-return pulse so that the radar frequency may be changed with every pulse to avoid ECM.

BRIEF DESCRIPTION OF THE PREFERRED EMBODIMENT

Figure 1:
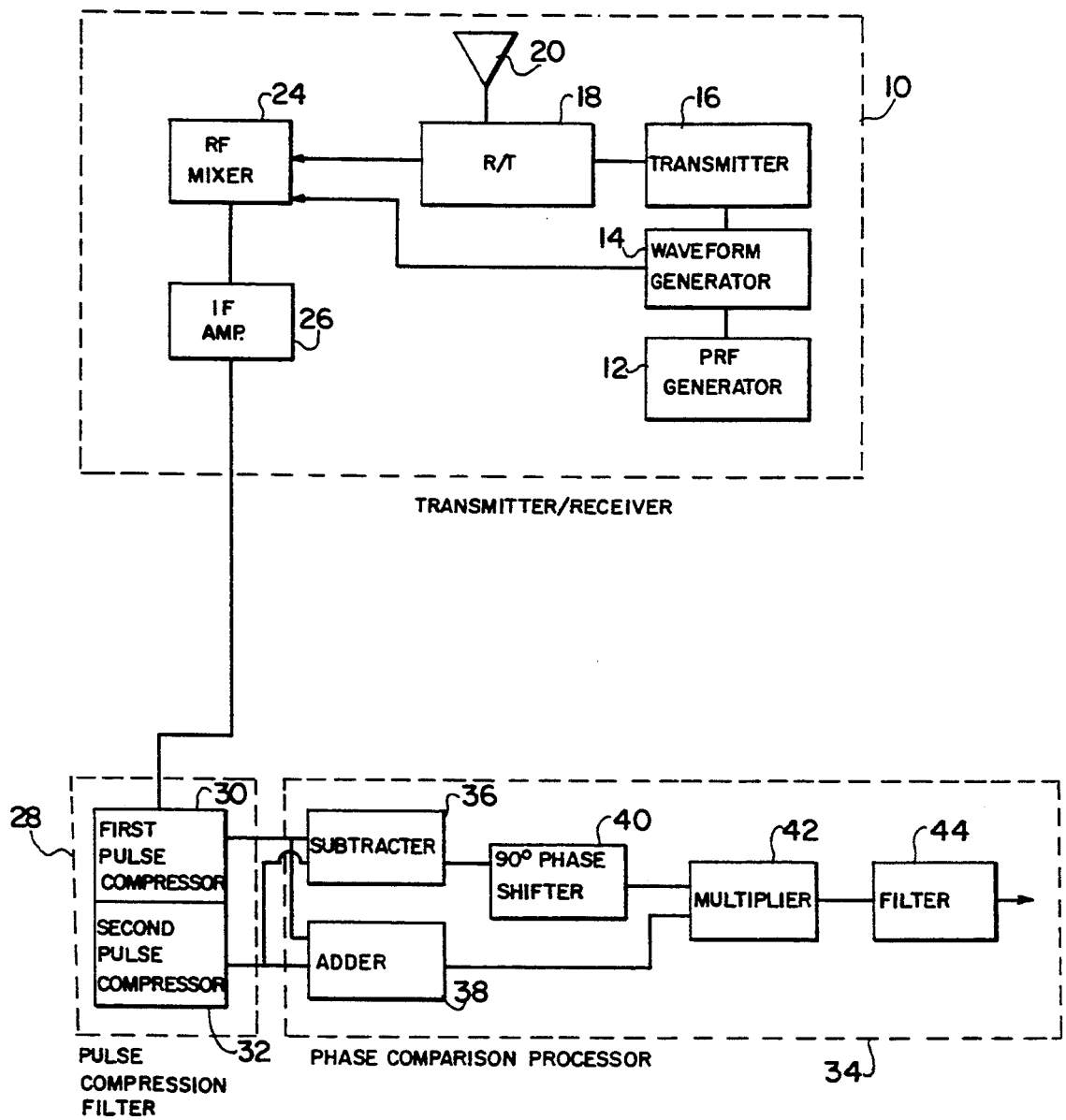
FIG. 1 is a block diagram representation of a pulse-compression, MTI, doppler-radar system improved by the addition of a pulse-compression filter and a phase-comparison processor.

A pulse-compression, MTI, doppler-radar system utilizing a pulse-compression filter and a phase-comparison processor is outlined in FIG. 1. A conventional pulse-compression, doppler-radar transmitter/receiver unit 10 operates at L band, typically 1200 MHz, and a PRF of 300 pulses per second and includes PRF generator 12, waveform generator 14, transmitter 16, R/T unit 18, antenna 20, RF mixer 24 and IF amplifier 26. Waveform generator 14 is a phase-coder for generating standard phase-coded uncompressed pulses and is of a conventional type such as that described in "Radar Design Principles," by F. E. Nathanson, 1969, pp 490, 491. A discussion of phase-coded pulse-compression techniques and optimum coding is provided at pp 497 and 498 of "Introduction to Radar Systems" by Skolnik (1962).

Connected to IF amplifier 26 is pulse-compression filter 28, which is composed of first pulse compressor 30 and second pulse compressor 32 which are shown in detain in FIG. 2 and described subsequently and may be of a conventional type as described in the above referenced "Radar Design Principles" by F. E. Nathanson, p. 320. First pulse compressor 30 is matched to the portion of waveform generator 14 that codes the last half of the uncompressed pulse such that the last half of the radar-return pulse autocorrelates optimally in first pulse compressor 30. In the same manner, second pulse compressor 32 is matched to the portion of waveform generator 14 that codes the first half of the uncompressed pulse. Note that waveform generator 14 generates a typical uncompressed pulse as used in pulse compression radars. The pulse is not separated into two halves until it is received in pulse compression filter 28. In summary, first and second pulse compressors 30, 32 autocorrelate the last and first halves of the target-return pulse, respectively, to produce a separate pulse-compressed signal for each half.

The pulse-compressed signals are fed to a conventional phase-comparison processor 34 normally used in phase-comparison angle-tracking radars as described in Skolnik, "Radar Handbook", page 21-27. Specifically, the pulse-compressed output from first pulse compressor 30 is fed to both subtracter 36 and adder 38. Likewise, the output of second pulse compressor 32 is fed to both subtracter 36 and adder 38. The output of subtracter 36, a difference signal, is fed to 90° phase shifter 40 which shifts the phase of the difference signal by 90°. The phase-shifted difference signal and the sum signal from adder 38 are fed to multiplier 42 which produces a video pulse which will indicate whether a target is stationary or moving. The video pulse is then fed through filter 44 which passes only the video pulse and excludes all other signals.

Figure 2:
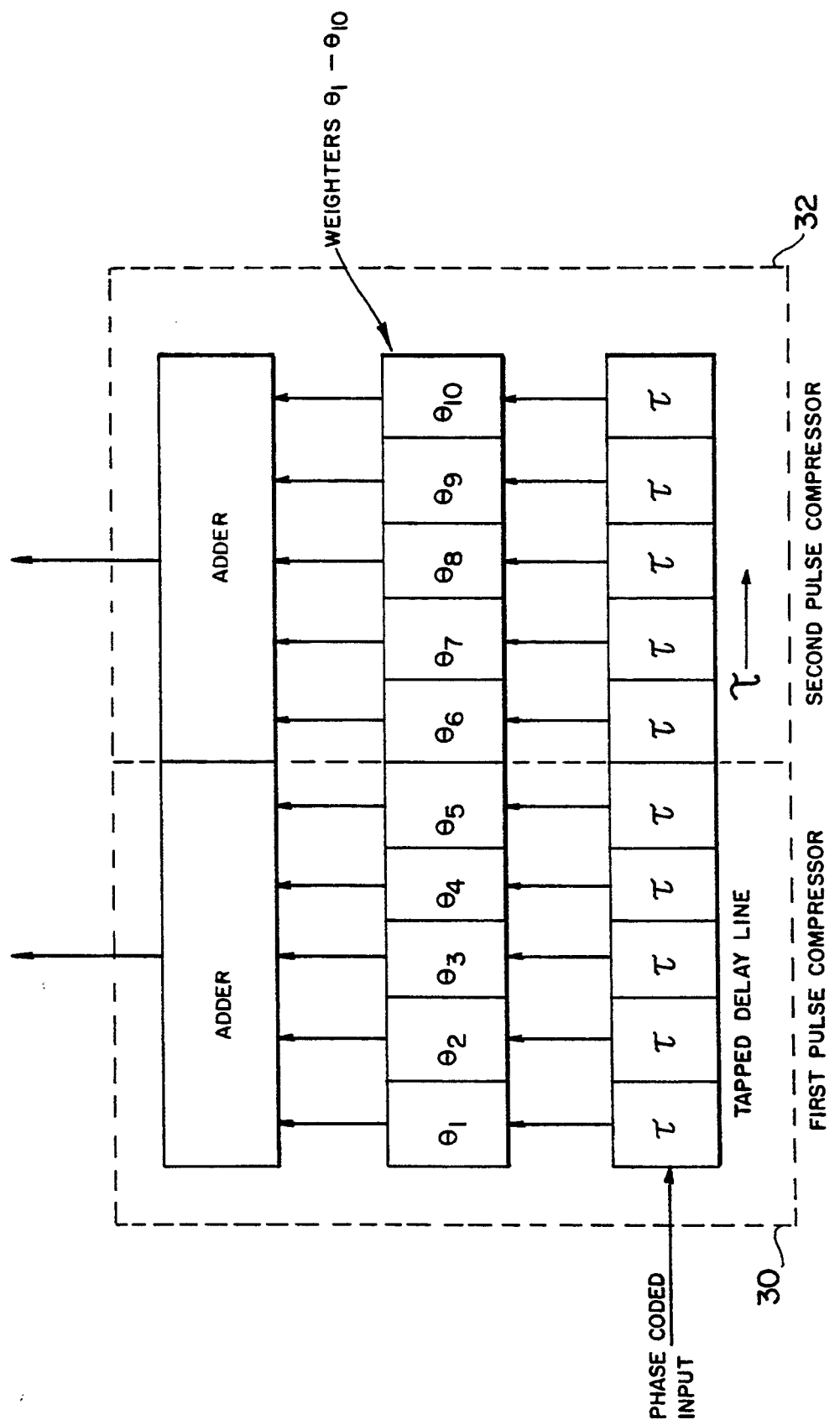
FIG. 2 is a schematic representation of a conventional pulse compressor utilized to form two separate pulse compressors.

FIG. 2 shows one embodiment of first and second pulse compressors 30 and 32. A standard pulse compressor is segmented into two sections with first pulse compressor 30 being made up of the first half of the tapped delay line having delays $\tau$, corresponding weighters $\theta_1$–$\theta_5$, and an adder. Pulse compressor 32 is made up of the second half of the tapped delay line with a corresponding weighters $\theta_5$–$\theta_{10}$ and an adder. The time delays are designed such that the two halves of the target-return pulse are pulse-compressed simultaneously, thus producing simultaneous outputs.

In operation, PRF generator 12 generates a train of pulses which are fed to waveform generator 14. Each pulse causes wave-form generator 14 to generate an uncompressed pulse which is made up of a number of segments each having a different phase (i.e. phase-coded). The uncompressed pulses are fed through transmitter 16, R/T unit 18, and antenna 20 for transmission.

Target-return pulses are received at antenna 20 and fed through R/T unit 18, RF mixer 24, and IF amplifier 26 to pulse compression filter 28.

Considering the invention generally, the target-return pulse from a moving target will have a phase change between its first and second halves. According to the invention, the target-return pulse is split up into a first half and a second half which are pulse-compressed separately and simultaneously such that the phases of the two compressed halves may be compared to determine the phase difference and hence the target velocity and direction. The invention allows phase information derived at different points in time (i.e. first and second halves of pulse) to be converted by pulse compression to the same time base such that the desired comparison of phase information may be made.

More specifically, the first and second halves of the target-return pulse are pulse-compressed simultaneously by second and first pulse compressors 32, 30, respectively. To accomplish this, the uncompressed pulse from IF amplifier 26 is applied to the tapped delay line as shown in FIG. 2. The delays $\tau$ for each segment of the uncompressed pulse are designed such that each segment is fed simultaneously from the tapped delay line to the respective weighter for either the front or back half of the uncompressed pulse. The weighted uncompressed segments are then fed to the proper adders where the compressed pulses corresponding to the front and back halves of the uncompressed pulse are formed. Returning to FIG. 1 both the first and second half compressed pulses are fed simultaneously to subtracter 36 and adder 38. In subtracter 36, a difference signal is produced which reflects the vector difference of the amplitude and phase of the compressed pulses. In adder 38, a sum signal is produced which reflects the vector sum of the amplitude and phase of the compressed pulses. Equal-amplitude compressed pulses produce difference signals with 90 and 270 degree phases with respect to the sum signal, while compressed pulses with amplitude differences produce 0 or 180 degree phase relationships between the sum and difference signals.

The difference signal from subtracter 36 is fed to phase shifter 40 where the phase is shifted 90°. This is necessary to bring the sum and difference signals into phase coincidence or opposition since the sum and difference vectors are orthogonal to each other for phase differences between the input compressed pulses. The phase-shifted difference is then fed to multiplier 42 where it is multiplied with the sum signal from adder 38. If the product of the multiplication is zero this means the target is stationary. The zero response to amplitude differences of the sum and difference signals makes this MTI tolerant of amplitude modulation on the transmitted pulses. This is a significant feature of this invention. If the phase difference is not zero, the product of the multiplication is a video pulse whose magnitude is proportional to the phase difference. The video pulse indicates the target is moving with a velocity proportional to the amplitude of the video pulse and in the direction indicated by the sign of the video pulse.

This invention could be used to detect moving targets at ranges less than that of any stand-off jammer operating in fast-set-on-spot jamming mode. The radar could change carrier frequency on a pulse-to-pulse basis and the jammer would not know what the radar's new frequency was until the radar's pulse was received by the jammer and the jammer measured the radar's signal. This spot jammer would then start jamming on the new frequency but its jamming signals would take time to get back to the radar. In the meantime, the radar would be receiving unjammed echoes from targets between the radar and the jammer. In normal tactics, spot jammers operate from 50 to 100 miles away from a radar they are jamming. This would insure a useful unjammed range for the radar employing this invention and pulse-to-pulse frequency changes.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a system transmitting phase-coded uncompressed pulses to a target and receiving reflected target return pulses, said system for determining target velocity information from a single said target return pulse, the improvement which comprises:

pulse-compression filter means receiving said target return pulses, said pulse-compression filter means including at least two pulse compressors for simultaneously pulse-compressing separate portions of said single target-return pulse; and phase-comparison means receiving pulse-compressed signals from said pulse-compression filter for determining the phase difference between said pulse-compressed signals from each said pulse-compressor, said phase-comparison processor means producing an output which is zero and indicating that said target is stationary if said phase difference is zero, and producing a video pulse indicating that said target is moving if said phase difference is non-zero.

2. In a pulse-compression, MTI, doppler-radar system for determining target velocity information from a single phase-coded, uncompressed target-return pulse, said system including a transmitter/receiver, the improvement which comprises:

pulse-compression filter means receiving the output of said transmitter/receiver, said pulse-compression filter means including at least two pulse compressors for simultaneously pulse-compressing separate portions of said single target-return pulse; and phase-comparison processor means receiving pulse-compressed signals from said pulse-compression filter for determining the phase difference between said pulse-compressed signals from each said pulse compressor, said phase-comparison processor means producing an output which is zero and indicating that said target is stationary if said phase difference is zero, and producing a video pulse indicating that said target is moving if said phase difference is non-zero.

3. In a pulse-compression, MTI, doppler-radar system for determining target velocity information from a single phase-coded, uncompressed target-return pulse, said system including a transmitter/receiver, the improvement which comprises:

first pulse-compressor means receiving the output of said transmitter/receiver for pulse-compressing the first half of said target-return pulse;

second pulse-compressor means receiving the output of said transmitter/receiver for pulse-compressing the second half of said single target-return pulse; and phase-comparison processor means receiving pulse compressed signals from said first and second pulse compressors for determining the phase difference between said pulse-compressed signals from said first and second pulse compressors, said phase-comparison processor means producing an output which is zero and indicating that said target is stationary if said phase difference is zero, and producing a video pulse indicating that said target is moving if said phase difference is non-zero.

4. A device as set forth in claim 3, wherein said phase-comparison processor includes:

adder means for receiving and adding said pulse compressed signals from said first and second pulse compressors;

subtracter means for receiving and subtracting said pulse compressed signals from said first and second pulse compressors;

phase shifter means receiving the output of said subtracter for shifting the phase of the subtracter output;

multiplier means receiving the outputs of said subtracter and said adder for multiplying said subtracter and adder outputs to obtain an output which may be either zero or a video pulse;

filter means receiving the output of said multiplier for filtering and passing said multiplier output.

* * * * *